(12) United States Patent
Park

(10) Patent No.: US 11,970,167 B2
(45) Date of Patent: Apr. 30, 2024

(54) DRIVER ASSISTANCE APPARATUS AND DRIVER ASSISTANCE METHOD

(71) Applicant: HL Klemove Corp., Pyeongtaek (KR)

(72) Inventor: Hyunsoo Park, Seoul (KR)

(73) Assignee: HL KLEMOVE CORP., Incheon (KR)

( * ) Notice: Subject to any disclaimer, the term of this patent is extended or adjusted under 35 U.S.C. 154(b) by 134 days.

(21) Appl. No.: 17/586,864

(22) Filed: Jan. 28, 2022

(65) Prior Publication Data

US 2022/0242409 A1 Aug. 4, 2022

(30) Foreign Application Priority Data

Feb. 1, 2021 (KR) .................. 10-2021-0014073

(51) Int. Cl.
*B60W 30/16* (2020.01)
*B60W 40/02* (2006.01)
*B60W 40/06* (2012.01)

(52) U.S. Cl.
CPC .......... *B60W 30/162* (2013.01); *B60W 40/02* (2013.01); *B60W 40/06* (2013.01); *B60W 2510/30* (2013.01); *B60W 2520/26* (2013.01); *B60W 2554/80* (2020.02); *B60W 2555/20* (2020.02)

(58) Field of Classification Search
CPC .......................... B60W 30/14; B60W 30/162
See application file for complete search history.

(56) References Cited

U.S. PATENT DOCUMENTS

| | | | |
|---|---|---|---|
| 2017/0057505 A1* | 3/2017 | Woodley | B60W 10/06 |
| 2019/0179338 A1* | 6/2019 | Kim | B60W 30/165 |
| 2019/0219691 A1* | 7/2019 | Meehan | G01W 1/06 |
| 2019/0293443 A1* | 9/2019 | Kelly | G01C 21/3484 |
| 2020/0156607 A1* | 5/2020 | Ueno | B60W 30/02 |
| 2020/0269839 A1* | 8/2020 | Sato | B60W 50/0097 |
| 2022/0009502 A1* | 1/2022 | Yokoyama | G06T 7/0004 |

FOREIGN PATENT DOCUMENTS

| | | |
|---|---|---|
| KR | 100535407 B1 | 12/2005 |
| KR | 20180069274 A | 6/2018 |
| KR | 102012678 B1 | 8/2019 |

* cited by examiner

*Primary Examiner* — Imran K Mustafa
(74) *Attorney, Agent, or Firm* — Harvest IP Law, LLP

(57) ABSTRACT

Disclosed herein, a driver assistance apparatus includes a detector installed in a vehicle, the detector having a view in front of a vehicle and configured to obtain detection data; and a controller including a processor configured to process the detection data; wherein the controller is configured to identify operation of a wiper of the vehicle and calculate a slip rate of the vehicle with respect to a road surface while performing an adaptive cruise control (ACC) that maintains a distance with a vehicle in front at a first distance based on the detection data, and control a driving of the vehicle to maintain the distance with the vehicle in front to a second distance greater than the first distance based on the operation of the wiper and the slip rate.

18 Claims, 11 Drawing Sheets

(a)

(b)

DRIVER ASSISTANCE APPARATUS AND DRIVER ASSISTANCE METHOD

CROSS-REFERENCE TO RELATED APPLICATION(S)

This application is based on and claims priority under 35 U.S.C. § 119 to Korean Patent Application No. 10-2021-0014073, filed on Feb. 1, 2021 in the Korean Intellectual Property Office, the disclosure of which is incorporated herein by reference in its entirety.

TECHNICAL FIELD

The disclosure relates to a driver assistance apparatus and a driver assistance method, and more particularly, to a driver assistance apparatus and a driver assistance method capable of controlling a vehicle based on external weather conditions such as bad weather.

BACKGROUND

Recently, vehicles are equipped with an adaptive cruise control (ACC) (also referred to as a smart cruise control (SCC)) system capable of reducing a driver's burden and enhancing convenience.

The ACC system may control a distance between a vehicle and an object in front, such as preceding vehicle, identified through a vehicle's radar sensor. The vehicle's radar sensors may transmit an electromagnetic wave signal, and then receive the reflected electromagnetic wave from an object (e.g., a vehicle in front and/or an obstacle, etc.) to estimate a distance between the vehicle and the object.

In a conventional ACC system, performance of the ACC system became weak in an environment such as bad weather, for example, rainy. For example, in an environment such as bad weather, performance degradation, for example, a blockage, may occur in the vehicle's radar sensor, and thus control operation of the ACC system may be automatically released regardless of the driver's intention. Furthermore, if the distance between a host vehicle and an object in front, for example, a preceding vehicle, is short, the blockage that is occurred in the radar sensor may cause the ACC system to be automatically released. At this case, a collision between the vehicle and the object in front is highly likely to occur.

SUMMARY

An aspect of the disclosure is to provide a driver assistance apparatus and driver assistance method capable of controlling an adaptive cruise control (ACC) (also referred to as a smart cruise control (SCC)) system of a vehicle in accordance with external weather conditions such as bad weather.

For example, an aspect of the disclosure is to provide a driver assistance apparatus and a driver assistance method capable of reducing a risk of an accident in ACC operation of a vehicle caused by deterioration of hardware detection performance of a front radar of a vehicle due to rain or snow.

Additional aspects of the disclosure will be set forth in part in the description which follows and, in part, will be obvious from the description, or may be learned by practice of the disclosure.

In accordance with an aspect of the disclosure, a driver assistance apparatus includes a detector installed in a vehicle, the detector having a view in front of a vehicle and configured to obtain detection data; and a controller including a processor configured to process the detection data; wherein the controller is configured to identify operation of a wiper of the vehicle and calculate a slip rate of the vehicle with respect to a road surface while performing an adaptive cruise control (ACC) that maintains a distance with a vehicle in front at a first distance based on the detection data, and control a driving of the vehicle to maintain the distance with the vehicle in front to a second distance greater than the first distance based on the operation of the wiper and the slip rate.

The controller may be configured to increase a predetermined reference time gap related to distance control between the vehicle and the vehicle in front to a predetermined amount based on the operation of the wiper and the slip rate; identify a speed of the vehicle to be controlled based on the predetermined reference time gap increased by the predetermined amount and the first distance; and control the driving of the vehicle so that the distance between the vehicle and the vehicle in front is changed to the second distance based on the identified speed.

The controlling of the driving of the vehicle may include controlling the vehicle to travel in deceleration, and the controller is configured to adjust downward an allowable maximum value of a predetermined acceleration of the vehicle based on the operation of the wiper and the slip ratio, and control the driving of the vehicle so that the vehicle decelerates based on the downward adjustment of the allowable maximum value of the predetermined acceleration.

The controller may be configured to identify weather conditions outside the vehicle as a rainy or snowy condition based on the operation of the wiper and the slip rate, and control the driving of the vehicle in response to identification of the weather conditions outside the vehicle as a rainy or snowy condition.

The controller may be configured to control the driving of the vehicle further based on operation speed of the wiper being greater than or equal to a predetermined reference speed.

The controller may be configured to identify external temperature information received from a temperature sensor of the vehicle, and control the driving of the vehicle further based on the external temperature information being less than or equal to a predetermined reference temperature.

The controller may be configured to calculate a gradient of the road surface based on a signal received from a gyro sensor of the vehicle, and control the driving of the vehicle further based on the gradient of the road surface.

The controller may be configured to calculate the slip ratio based on the speed of the vehicle and a rotation speed of each wheel of the vehicle.

In accordance with another aspect of the disclosure, a driver assistance apparatus includes a first detector installed in a vehicle, the first detector having a view in front of a vehicle and configured to obtain first detection data; and a controller including a processor configured to process the first detection data, wherein the controller is configured to change a reference control timing of an adaptive cruise control (ACC) for maintaining a distance with a vehicle in front as a first distance based on the first detection data, based on at least one of operation of a wiper of the vehicle or operation of a high beam of the vehicle; identify a control timing corresponding to the changed reference control timing of the ACC; and in response to the identification of the control timing, control a driving of the vehicle to maintain the distance with the vehicle in front to a second distance greater than the first distance.

The driver assistance apparatus may further include at least one second detector, wherein the controller is configured to turn on the at least one second detector based on at least one of the operation of the wiper or the operation of the high beam, and identify the control timing further based on second detection data obtained through the at least one second detector.

The controller may be configured to rapidly change a predetermined braking responsiveness of the vehicle to a first speed based on the at least one of the operation of the wiper or the operation of the high beam.

The controller may be configured to change a distance step between the vehicle and the vehicle in front to a predetermined distance step based on the at least one of the operation of the wiper or the operation of the high beam, and the predetermined distance step corresponds to the second distance.

The controller may be configured to control a output device to output a warning signal through the output device of the vehicle in response to that a control value of an accelerator of the vehicle based on a user manipulation is greater than or equal to a predetermined reference value.

The controller may be configured to release the ACC in response to that the control value of the accelerator of the vehicle is greater than or equal to the predetermined reference value.

In accordance with another aspect of the disclosure, a driver assistance method, the method including the steps of identifying operation of a wiper of a vehicle and calculating a slip rate of the vehicle with respect to a road surface while performing an adaptive cruise control (ACC) for maintaining a distance with a vehicle in front at a first distance based on detection data obtained through a detector; and controlling a driving of the vehicle to maintain the distance with the vehicle in front to a second distance greater than the first distance, based on the operation of the wiper and the slip rate.

The step of controlling may include increasing a predetermined reference time gap related to distance control between the vehicle and the vehicle in front to a predetermined amount based on the operation of the wiper and the slip rate; identifying a speed of the vehicle to be controlled based on the predetermined reference time gap increased by the predetermined amount and the first distance; and controlling the driving of the vehicle so that the distance between the vehicle and the vehicle in front is changed to the second distance based on the identified speed.

The method may further include a step of adjusting downward an allowable maximum value of a predetermined acceleration of the vehicle based on the operation of the wiper and the slip ratio, and controlling the driving of the vehicle so that the vehicle decelerates based on the downward adjustment of the allowable maximum value of the predetermined acceleration.

The step of controlling may include identifying weather conditions outside the vehicle as a rainy or snowy condition based on the operation of the wiper and the slip rate, and controlling the driving of the vehicle in response to identification of the weather conditions outside the vehicle as a rainy or snowy condition.

The step of controlling may include controlling the driving of the vehicle further based on operation speed of the wiper being greater than or equal to a predetermined reference speed.

The step of controlling may include identifying external temperature information received from a temperature sensor of the vehicle, and controlling the driving of the vehicle further based on the external temperature information being less than or equal to a predetermined reference temperature.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
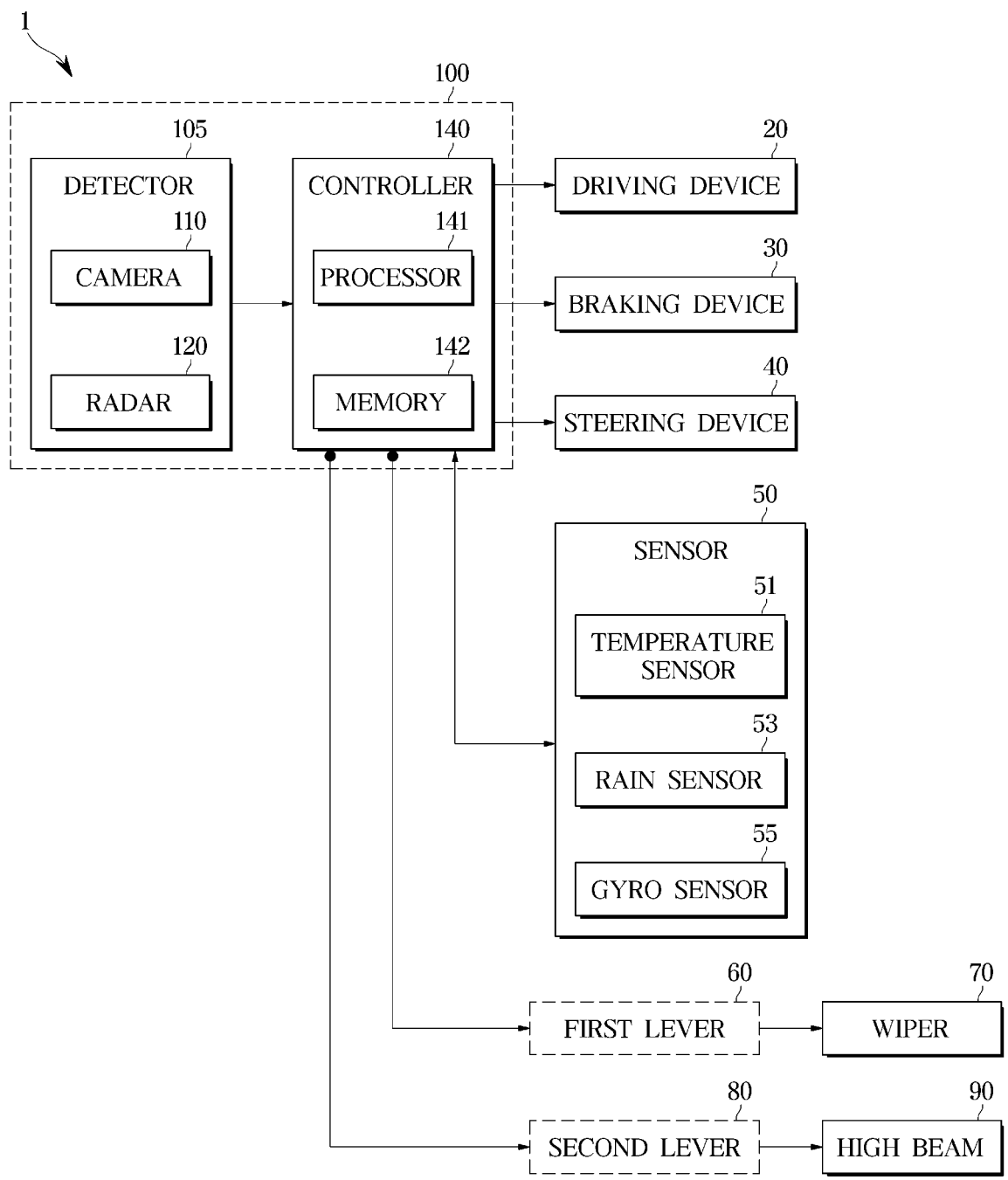
FIG. 1 is a view illustrating a configuration of a vehicle according to an embodiment of the disclosure.

Like numerals refer to like elements throughout the specification. Not all elements of embodiments of the disclosure will be described, and description of what are commonly known in the art or what overlap each other in the embodiments will be omitted.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless the context clearly indicates otherwise.

Further, when it is stated that a member is "on" another member, the member may be directly on the other member or a third member may be disposed therebetween.

Terms such as "~ unit", "~ group", "~ block", "~ member", and "~ module" used in the specification may be implemented in software or hardware. Terms such as "~ unit", "~ group", "~ block", "~ member", and "~ module"

may refer to a unit that processes at least one function or operation. In addition, terms such as "~ unit", "~ group", "~ block", "~ member", and "~ module" are used in at least one piece of hardware such as a field-programmable gate array (FPGA)/application specific integrated circuit (ASIC), or at least one software or processor stored in a memory.

Although the terms "first," "second," "A," "B," etc. may be used to describe various components, the terms do not limit the corresponding components, but are used only for the purpose of distinguishing one component from another component.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Hereinafter, operating principles and embodiments of the disclosure will be described with reference to the accompanying drawings.

FIG. 1 is a view illustrating a configuration of a vehicle according to an embodiment of the disclosure.

Referring to FIG. 1, a vehicle 1 includes a driving device 20, a braking device 30, a steering device 40, a driver assistance apparatus 100, a sensor 50, a wiper 70 and/or a wiper switch 65 and those may communicate with each other via vehicle communication network (NT). For example, the electronic devices 10, 20, 30, 40, 50, 60 and 100 included in the vehicle 1 may be used to exchange data through Ethernet, Media Oriented Systems Transport (MOST), Flexray, Controller Area Network (CAN), Local Interconnect Network (LIN), and the like.

The driving device 20 moves the vehicle 1 and may include, for example, an engine, engine management system (EMS), transmission and a transmission control unit (TCU).

The engine generates power for driving the vehicle 1, and the EMS may control the engine in response to a driver's intention to accelerate through an accelerator pedal or a request from the driver assistance apparatus 100.

The transmission decelerates and transmits the power generated by the engine to wheels, and the TCU may control the transmission in response to a driver's shift instruction through a shift lever and/or a request from the driver assistance apparatus 100.

The braking device 30 stops the vehicle 1, and may include, for example, a brake caliper and a brake control module (EBCM).

The brake caliper may decelerate the vehicle 1 or stop the vehicle 1 by using friction with a brake disc, and the EBCM may control the brake caliper in response to the driver's intention to brake through a brake pedal and/or a request of the driver assistance apparatus 100.

For example, the EBCM may receive a deceleration request including a degree of deceleration from the driver assistance apparatus 100, and electrically or hydraulically controls the brake caliper to decelerate the vehicle 1 depending on the requested degree of deceleration.

The steering device 40 may include an Electronic Power Steering (EPS) Control Module.

The steering device 40 may change a driving direction of the vehicle 1, and EPS control module may assist the operation of the steering device 40 so that a driver easily manipulate a steering wheel in response to the driver's intention to steer through the steering wheel. Furthermore, the EPS control module may control the steering device in response to a request from the driver assistance apparatus 100. For example, the EPS control module may receive a steering request including a steering torque from the driver assistance apparatus 100 and control the steering device to steer the vehicle 1 depending on the requested steering torque.

The sensor 50 may include a temperature sensor 51, a rain sensor 53, and/or a gyro sensor 55.

The temperature sensor 51 may measure (or also referred to as detect or identify) outside temperature of the vehicle 1.

The rain sensor 53 may measure amount and speed of rainwater.

The gyro sensor 55 may measure angular velocity of the vehicle 1.

A first lever 60 may operate the wiper 70 of the vehicle 1 according to a user manipulation.

Because a configuration of the first lever 60 will be described later with reference to FIG. 9A, a detailed description thereof will be omitted.

The wiper 70 may operate based on an output signal of the rain sensor 54 or the user manipulation of the first lever 60.

The wiper 70 may be installed on at least a portion of a windshield glass of the vehicle 1, and may remove moisture or foreign substances from the windshield glass so that a field of view of the driver may be secured.

A second lever 80 may operate a lighting device such as a high beam 90 of the vehicle 1 according to a user manipulation.

Because a configuration of the second lever 80 will be described later with reference to FIG. 9B, a detailed description thereof will be omitted.

The driver assistance apparatus 100 may provide various functions to the driver. For example, the driver assistance apparatus 100 may provide Lane Departure Warning (LDW), Lane Keeping Assist (LKA), Lane Following Assist, High Beam Assist (HBA), Autonomous Emergency Braking (AEB), Traffic Sign Recognition (TSR), Adaptive Cruise Control (ACC), and Blind Spot Detection (BSD), and the like.

The driver assistance apparatus 100 includes a detector 105 and a controller 140. The detector 105 may include a camera 110 and a radar 120, but is not limited to that shown in FIG. 1, and further include a Light Detection and Ranging (lidar) that scans around the vehicle 1 and detects an object.

Figure 2:
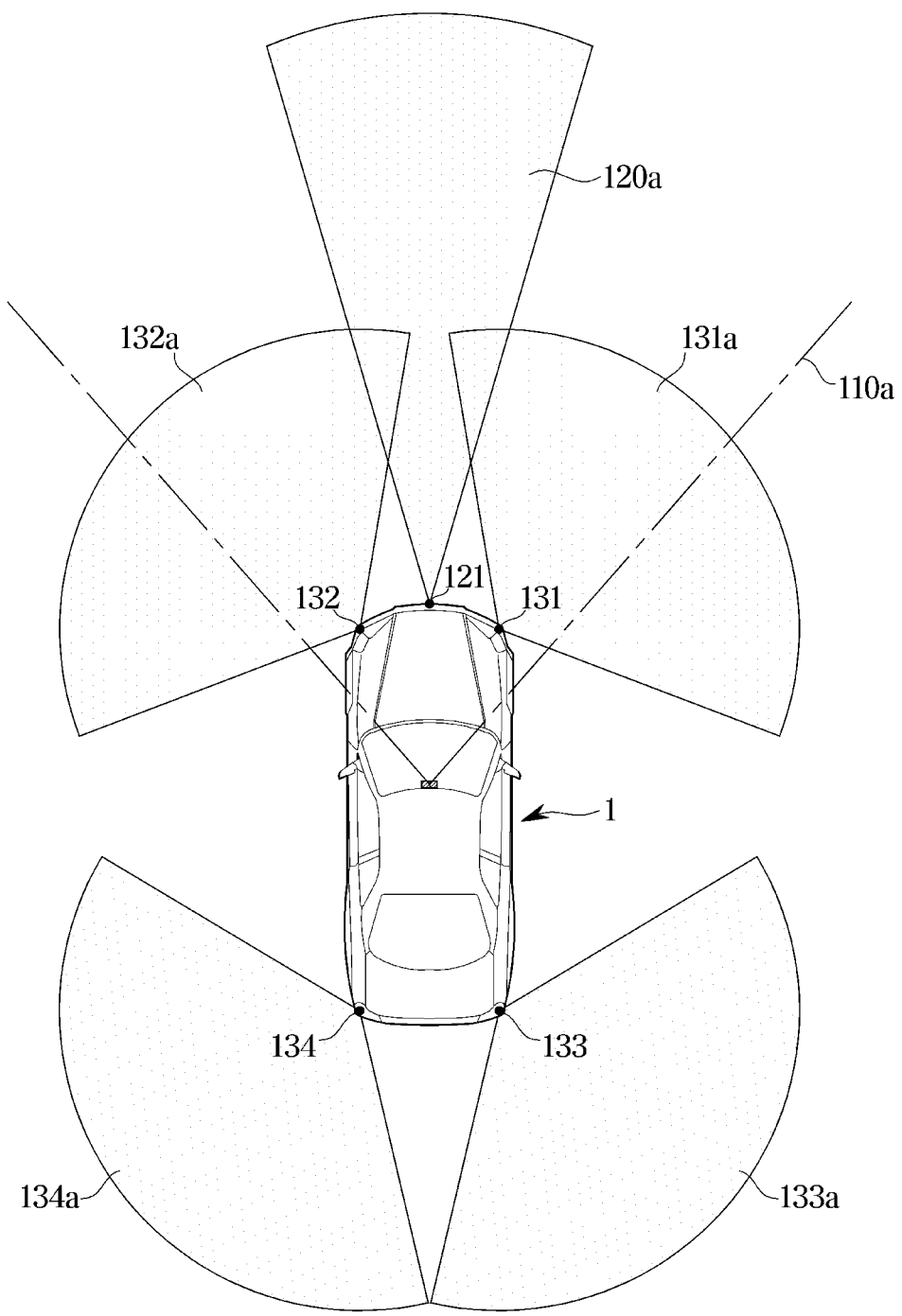
FIG. 2 is a view illustrating a field of view of a camera and a radar included in a driver assistance apparatus according to an embodiment of the disclosure.

The camera 110 may have a field of view 110a facing in front of the vehicle 1 as shown in FIG. 2. The camera 110 may be installed, for example, on a front windshield of the vehicle 1.

The camera 110 may photograph in front of the vehicle 1 and obtain image data of in front of the vehicle 1. The image data in front of the vehicle 1 may include information on other vehicles or pedestrians or cyclists or lanes (markers for distinguishing lanes), which are positioned in front of the vehicle 1.

The camera 110 may include a plurality of lenses and an image sensor. The image sensor may include a plurality of photodiodes that convert a light into an electrical signal, and the plurality of photodiodes may be arranged in a two-dimensional matrix.

The camera 110 may be electrically connected to the controller 140. For example, the camera 110 may be connected to the controller 140 through the NT, connected to the controller 140 through a hard wire, or connected to the controller 140 through a printed circuit board (PCB). The camera 110 may transmit the image data in front of the vehicle 1 to the controller 140.

The radar 120 may include a first radar 121 (also referred to as a forward radar) and/or at least one second radar 131, 132, 133 and 134 (also referred to as a corner radar) as shown in FIG. 2.

The first radar 121 may have a field of sensing 120*a* facing in front of the vehicle 1 as shown in FIG. 2. The first radar 121 may be installed, for example, on a grille or a bumper of the vehicle 1.

The first radar 121 may include a transmission antenna (or a transmission antenna array) that radiates a transmission wave toward in front of the vehicle 1, and a reception antenna (or a reception antenna array) that receives the reflected wave reflected by the object. The first radar 121 may obtain detection data from the transmitted wave transmitted by the transmission antenna and the reflected wave received by the reception antenna. The detection data may include distance information and speed degrees about other vehicles or pedestrians or cyclists located in front of the vehicle 1. The first radar 121 may calculate a state distance to the object based on phase difference (or time difference) between the transmitted wave and the reflected wave, and calculate relative speed of the object based on frequency difference between the transmit wave and the reflected wave.

The first radar 121 may be connected to the controller 140 through, for example, the NT or the hard wire or the PCB. The first radar 121 may transmit the detection data to the controller 140.

The second radars 131, 132, 133 and 134 may include a first corner radar 131 installed on a front right side of the vehicle 1, a second corner radar 132 installed on a front left side of the vehicle 1, a third corner radar 133 installed on a rear right side of the vehicle 1, and a fourth corner radar 134 installed on a rear left side of the vehicle 1.

The first corner radar 131 may have a field of sensing 131*a* facing the front right side of the vehicle 1 as shown in FIG. 2, and may be installed, for example, on a right side of a front bumper of the vehicle 1. The second corner radar 132 may have a field of sensing 132*a* facing the front left side of the vehicle 1, and may be installed, for example, on a left side of the front bumper of the vehicle 1. The third corner radar 133 may have a field of sensing 133*a* facing the rear right of the vehicle 1, and may be installed, for example, on a right side of a rear bumper of the vehicle 1. The fourth corner radar 134 may have a field of sensing 134*a* facing the rear left of the vehicle 1, and may be installed, for example, on a left side of the rear bumper of the vehicle 1.

Each of the first, second, third, and fourth corner radars 131, 132, 133, and 134 may include a transmission antenna and a reception antenna. The first, second, third, and fourth corner radars 131, 132, 133 and 134 may obtain first corner detection data, second corner detection data, third corner detection data, and fourth corner detection data, respectively. The first corner detection data may include distance information and speed degrees about other vehicles or pedestrian or cyclist (hereinafter referred to as an object) located in the right front side of the vehicle 1. The second corner detection data may include distance information and speed degrees of the object located in the front left side of the vehicle 1. The third and fourth corner detection data may include distance information and relative speed of the objects located in the rear right side of the vehicle 1 and the rear left side of the vehicle 1.

Each of the first, second, third and fourth corner radars 131, 132, 133, and 134 may be connected to the controller 140 through, for example, the NT or the hard wire or the PCB. The first, second, third, and fourth corner radars 131, 132, 133, and 134 may transmit first, second, third, and fourth corner detection data to the controller 140, respectively.

The controller 140 may be electrically connected to the detector 105, for example, the camera 110 and the radar 120. Furthermore, the controller 140 may be connected to a navigation device 10, the driving device 20, the braking device 30, the steering device 40, the sensor 50, the first lever 60, and the second lever 80.

The controller 140 includes a processor 141 and a memory 142.

The processor 141 may process image data of the detector 105, for example, the camera 110 and the detection data of the radar 120, and generate a driving signal, a braking signal and a steering signal for controlling the driving device 20, the braking device 30, and the steering device 40. For example, the processor 141 may include an image processor that processes the image data of the camera 110, and/or a digital signal processor that processes the detection data of the radar 120, and/or a micro control unit (MCU) that generates a driving signal/braking signal/steering signal. The MCU inside camera system may be integrated with an imaging system, and may also be implemented as a two-box system that is arranged separately from the imaging system. Furthermore, by arranging not only the MCU device but also a new upper level Domain control unit (DCU), the camera and radar system may be integrated and controlled.

The processor 141 may detect the objects (e.g., other vehicles, pedestrians, cyclist, etc.) in front of the vehicle 1 based on the image data of the detector 105, for example, the camera 110 and the detection data of the radar 120.

The processor 141 may obtain relative positions (a distance from the vehicle and an angle to a driving direction) and classification (e.g., whether the object is other vehicles or pedestrians or cyclists, etc.) of the objects in front of the vehicle 1 based on the image data of the camera 110. The processor 141 may obtain the relative positions (the distance from the vehicle and the angle to the driving direction) and relative speeds of the objects in front of the vehicle 1 based on the detection data of the radar 120. Furthermore, the processor 141 may match the objects detected by the detection data to the objects detected by the image data, and obtains the classification, the relative positions and the relative speeds of the objects around the vehicle 1 based on the matching result.

The processor 141 may generate the driving signal, the braking signal, and the steering signal based on the relative positions and relative speeds of the objects in front. For example, the processor 141 may transmit the driving signal and/or the braking signal to the driving device 20 and/or the braking device 30 so that the distance with a preceding vehicle (or a time until reaching the position of the preceding vehicle) becomes a distance set by the driver. The processor 141 may calculate a time to collision (TTC) (or a distance to collision, TTD) between the vehicle 1 and the object in front based on the position (distance) and relative speed of the objects in front, and warn the driver of a collision or transmit the braking signal to the braking device 30 based on the comparison between the TTC and a reference value. Furthermore, in response to determining that the collision with the object in front occurs based on the TTC or the TTD, the processor 141 may transmit the steering signal to the steering device 40 to avoid the collision with the object in front.

The processor 141 may control the steering device 40 to assist steering in order to avoid the collision of the vehicle 10 so that the vehicle 1 does not deviate from a target lane. For example, the processor 141 may minimize a risk of collision possibility in steering in order to avoid a collision of the vehicle 10 based on a driver manipulation.

The memory 142 may temporarily store the image data received from the detector 105, for example, the camera 110 and/or the detection data received from the radar 120, and temporarily store the processing result of the image data and/or the detection data of the processor 141.

The memory 142 may include not only volatile memories such as a static random access memory (S-RAM) and a dynamic random-access memory (D-RAM), but also non-volatile memory such as a flash memory, a read-only memory (ROM), an erasable programmable read only memory (EPROM), and the like.

Figure 3:
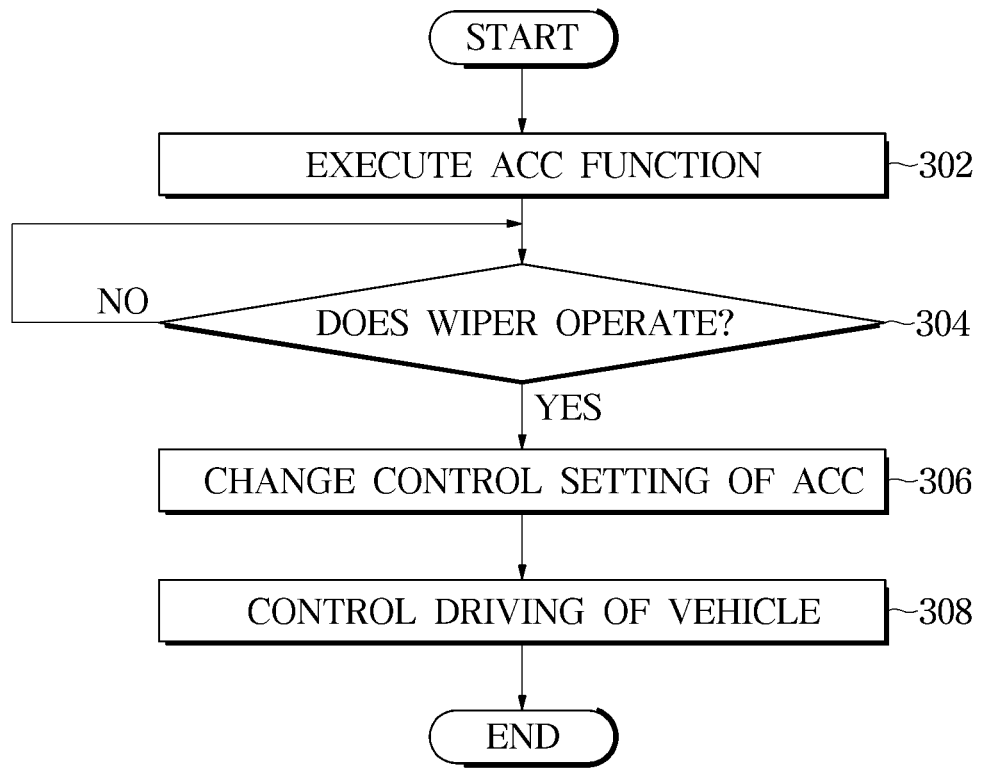
FIG. 3 is a flowchart illustrating operation of a driver assistance apparatus according to an embodiment of the disclosure.

FIG. 3 is a flowchart illustrating operation of the driver assistance apparatus 100 (and/or the controller 140 of the driver assistance apparatus 100) according to an embodiment of the disclosure.

The driver assistance apparatus 100 may execute the ACC function (also referred to as the SCC function) of the vehicle 1 (in operation 302).

The driver assistance apparatus 100 may control the driving of the vehicle 1 based on the detection data obtained through the detector 105 in response to the execution of the ACC function.

The driver assistance apparatus 100 may identify whether the wiper 70 of the vehicle 1 operates or not in response to the execution of the ACC function of the vehicle 1 (in operation 304).

The driver assistance apparatus 100 may identify that the wiper 70 of the vehicle 1 operates in response to that the wiper 70 of the vehicle 1 operates for a predetermined time or longer.

For example, the driver assistance apparatus 100 may identify the operation of the wiper 70 based on a user operation on the first lever 60 for controlling the wiper 70 or an output signal of the rain sensor 53.

The driver assistance apparatus 100 may perform operation 306 when the wiper 70 of the vehicle 1 operates, otherwise may perform operation 304 again.

The driver assistance apparatus 100 may change a control setting of the ACC in response to the operation of the wiper 70 of the vehicle 1 (in operation 306).

Changing the control setting of the ACC may include changing the distance between the vehicle 1 and the preceding vehicle (also referred to as vehicle in front) during the operation of the ACC, changing an acceleration of the ACC (also referred to as the requested acceleration), and/or changing a control timing of the ACC, and the like.

Since detailed embodiments of the changing the control settings of the ACC have been described with reference to FIGS. 4 to 11, detailed descriptions thereof will be omitted.

The driver assistance apparatus 100 may control the driving of the vehicle 1 based on the changing of the control setting of the ACC (in operation 308).

The driver assistance apparatus 100 may control the driving of the vehicle 1 to maintain the distance between the vehicle 1 and the preceding vehicle from a first distance to a second distance greater than the first distance based on the changing of the control setting of the ACC. The driver assistance apparatus 100 may control the driving of the vehicle 1 so that the vehicle 1 decelerates from a first speed to a second speed slower than the first speed based on the changing of the control setting of the ACC.

Figure 4:
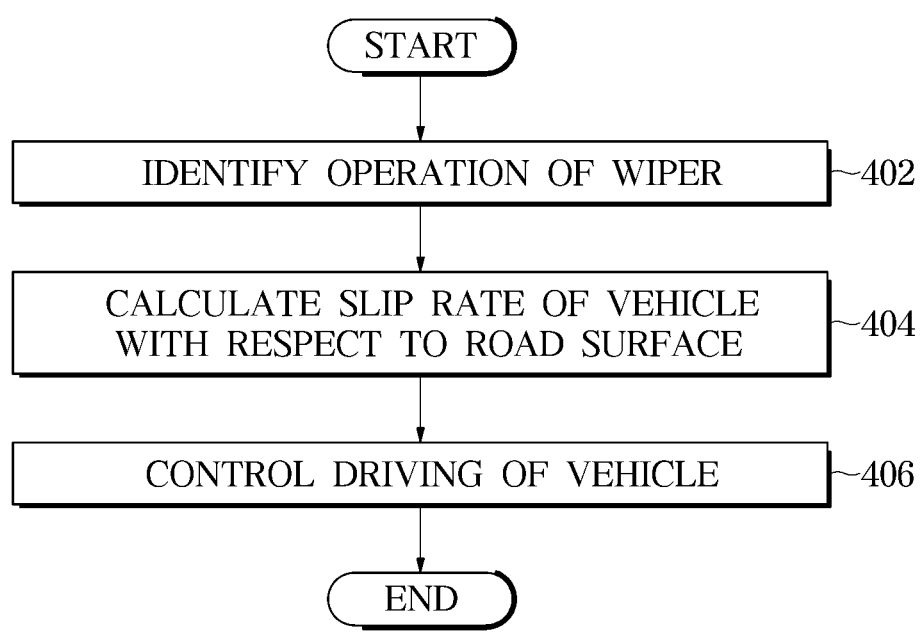
FIG. 4 is a flowchart illustrating operation of a driver assistance apparatus according to an embodiment of the disclosure.
Figure 5:
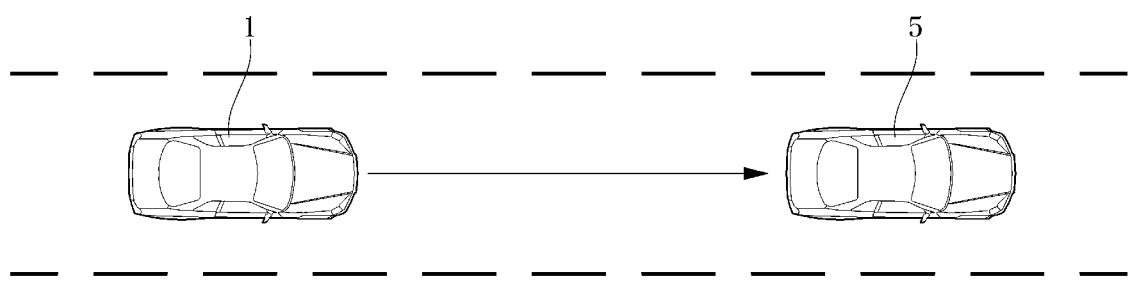
FIG. 5 is a view illustrating distance control between a vehicle of a driver assistance apparatus and a preceding vehicle positioned in front of the vehicle according to an embodiment of the disclosure.

FIG. 4 is a flowchart illustrating the operation of the driver assistance apparatus 100 (and/or the controller 140 of the driver assistance apparatus 100) according to an embodiment of the disclosure. FIG. 5 is a view illustrating distance control between the vehicle of a driver assistance apparatus according to an embodiment of the disclosure and the preceding vehicle positioned in front of the vehicle.

The driver assistance apparatus 100 may identify the operation of the wiper 70 of the vehicle 1 (in operation 402).

The driver assistance apparatus 100 may identify whether the wiper 70 of the vehicle 1 operates for a predetermined reference time or longer and/or whether operation speed of the wiper 70 is greater than or equal to a predetermined reference speed.

The driver assistance apparatus 100 may calculate a slip rate of the vehicle 1 relative to a road surface (in operation 404).

The driver assistance apparatus 100 may calculate the slip ratio of the vehicle 1 relative to the road surface based on a friction coefficient between a tire of the vehicle 1 and the road surface that may vary depending on external weather conditions, which may a basis for the determination of weather conditions.

The driver assistance apparatus 100 may calculate the slip ratio of the vehicle 1 with respect to the road surface based on the speed of the vehicle 1 and the rotation speed of each wheel of the vehicle 1. Calculating the slip ratio of the vehicle 1 with respect to the road surface is a conventionally well-known technologies, and thus a detailed description thereof will be omitted.

The driver assistance apparatus 100 may identify whether the slip ratio of the vehicle 1 with respect to the road surface is equal to or greater than a predetermined reference value.

The driver assistance apparatus 100 may control the driving of the vehicle 1 based on the operation of the wiper 70 of the vehicle 1 and the slip ratio of the vehicle 1 with respect to the road surface (in operation 406).

The driver assistance apparatus 100 may perform operations 402, 404 and 406 during the controlling of the driving of the vehicle 1 based on the detection data obtained through the detector 105, for example, during the operation of the ACC.

For example, when it rains or snows outside the vehicle 1 during the operation of the ACC in which the vehicle 1 maintains the distance with the preceding vehicle at the first distance, the driver assistance apparatus 100 may change some of predetermined control settings of the ACC. The driver assistance apparatus 100 may control the driving of the vehicle 1 based on the change in a part of the predetermined control settings of the ACC.

The driver assistance apparatus 100 may identify weather conditions outside the vehicle 1 as a rain or snow condition based on the operation of the wiper 70 of the vehicle 1 and the slip rate of the vehicle 1 with respect to the road surface. For example, in response to that the operation speed of the wiper 70 is greater than or equal to the predetermined speed while the wiper 70 is operated for the predetermined reference time or longer or the slip ratio of the vehicle 1 with respect to the road surface is greater than or equal to the predetermined reference value, the driver assistance apparatus 100 may identify weather conditions outside the vehicle 1 as a rain or snow condition.

In response to identifying that the weather conditions outside the vehicle 1 as a rain or snow condition, the driver assistance apparatus 100 may controls the driving of the vehicle 1 by changing in a part of the predetermined control settings of the ACC.

The driving control of the vehicle 1 may include controlling the distance between the vehicle 1 and the preceding vehicle 5 located in front of the vehicle 1 and/or controlling the speed of the vehicle 1 as shown in FIG. 5.

For example, the driver assistance apparatus 100 may identify the preceding vehicle 5 located in front of the vehicle 1 based on the detection data obtained through the detector 105, and identify the distance between the vehicle 1 and the preceding vehicle 5.

In response to identifying that the weather conditions outside the vehicle 1 as a rain or snow condition, the driver assistance apparatus 100 may control the vehicle 1 so that the distance between the vehicle 1 and the preceding vehicle 5 increases by a predetermined amount. More specifically, the driver assistance apparatus 100 may control the distance between the vehicle 1 and the preceding vehicle 5 to be changed from the first distance to the second distance.

In response to identifying that the weather conditions outside the vehicle 1 as a rain or snow condition, the driver assistance apparatus 100 may increase a predetermined reference time gap related to the distance control between the vehicle 1 and the preceding vehicle by a predetermined amount (or size).

The driver assistance apparatus 100 may identify the speed to be controlled of the vehicle 1 based on the reference time gap increased to the predetermined amount and the first distance.

For example, the driver assistance apparatus 100 may calculate the speed to be controlled of the vehicle 1 through operation of dividing the first distance by the reference time gap increased by the predetermined amount.

The driver assistance apparatus 100 may control the driving of the vehicle 1 so that the distance between the vehicle 1 and the preceding vehicle 5 is changed from the first distance to the second distance based on the identified speed.

For example, in the ACC, the predetermined reference time gap may be set for each distance step between the vehicle 1 and the preceding vehicle 5. In response to identifying that the weather conditions outside the vehicle 1 as a rain or snow condition, the driver assistance apparatus 100 may change the setting of the predetermined reference time gap for each distance step between the vehicle 1 and the preceding vehicle 5.

First to fourth distance steps may be predetermined, and a distance between the vehicles (also referred to as headway distance) may be predetermined to increase from the first distance step to the fourth distance step, and the reference distance may be predetermined. Furthermore, the reference time gap corresponding to each of the first to fourth distance steps may be predetermined.

For example, a reference time gap T1 of the first distance step may be predetermined to 1.0 seconds, a reference time gap T2 of the second distance step may be predetermined to 1.3 seconds, a reference time gap T3 of the third distance step may be predetermined to 1.6 seconds, and a reference time gap T4 of the fourth distance step may be predetermined to 2.1 seconds.

In response to that the conditions for changing the setting of the reference time gap described above are satisfied, the driver assistance apparatus 100 may change and set the reference time gap T1 of the first distance step being 1.3 seconds, the reference time gap T2 of the second distance step being 1.6 Seconds, the reference time gap T3 of the third distance step being 2.0 seconds, and the reference time gap T4 of the fourth distance step being 2.5 seconds. Accordingly, the reference distances of each of the first to fourth distance steps may be changed and set.

The driver assistance apparatus 100 may change and set the speed of the vehicle 1 to be controlled corresponding to each of the first to fourth distance steps based on the change setting of the reference time gap.

In response to that the distance between the vehicle 1 and the preceding vehicle 5 is set to be controlled to be any one of the first to fourth distance steps, the driver assistance apparatus 100 may control the vehicle 1 to have the changed speed set for the corresponding distance step. Accordingly, the distance between the vehicle 1 and the preceding vehicle 5 may be changed (increased) by the changed set reference distance.

Thereafter, the driver assistance apparatus 100 may control the vehicle 1 so that the distance between the vehicle 1 and the preceding vehicle 5 is constantly maintained at a predetermined size (e.g., length).

In response to identifying that the weather conditions outside the vehicle 1 as a rain or snow condition, the driver assistance apparatus 100 may adjust downward an allowable maximum value of a predetermined acceleration of the vehicle 1. The driver assistance apparatus 100 may control the driving of the vehicle 1 so that the vehicle 1 decelerates based on the downward adjustment of the allowable maximum value of the predetermined acceleration.

On the other hand, in the above-described embodiments, both the operation of the wiper 70 of the vehicle 1 and the slip ratio of the vehicle 1 with respect to the road surface 1 are considered, and the driving control of the vehicle 1, for example, increasing the distance with the preceding vehicle 5 and/or decelerating running of the vehicle 1 has been described. However, according to another embodiment, the driver assistance apparatus 100 may control the driving of the vehicle 1 based only on the operation of the wiper 70 of the vehicle 1. Alternatively, the driver assistance apparatus 100 may control the driving of the vehicle 1 based on only the slip rate of the vehicle 1 with respect to the road surface.

Furthermore, in addition to the above-described embodiment of FIG. 4, the driver assistance apparatus 100 may further identify external temperature information received from the temperature sensor 51 of the vehicle 1. The driver assistance apparatus 100 may perform the above-described driving control of the vehicle 1, for example, increasing the distance with the preceding vehicle 5 and/or decelerating running of the vehicle 1 further based on the external temperature information being less than or equal to a predetermined reference temperature.

Furthermore, in addition to the above-described embodiment of FIG. 4, the driver assistance apparatus 100 may receive a signal from the gyro sensor 55 of the vehicle 1, and calculate a gradient of the road surface based on the received signal. The driver assistance apparatus 100 may perform the above-described driving control of the vehicle 1, for example, increasing the distance with the preceding vehicle 5 and/or decelerating running of the vehicle 1 further based on the calculated the calculated gradient of the road surface.

Figure 6:
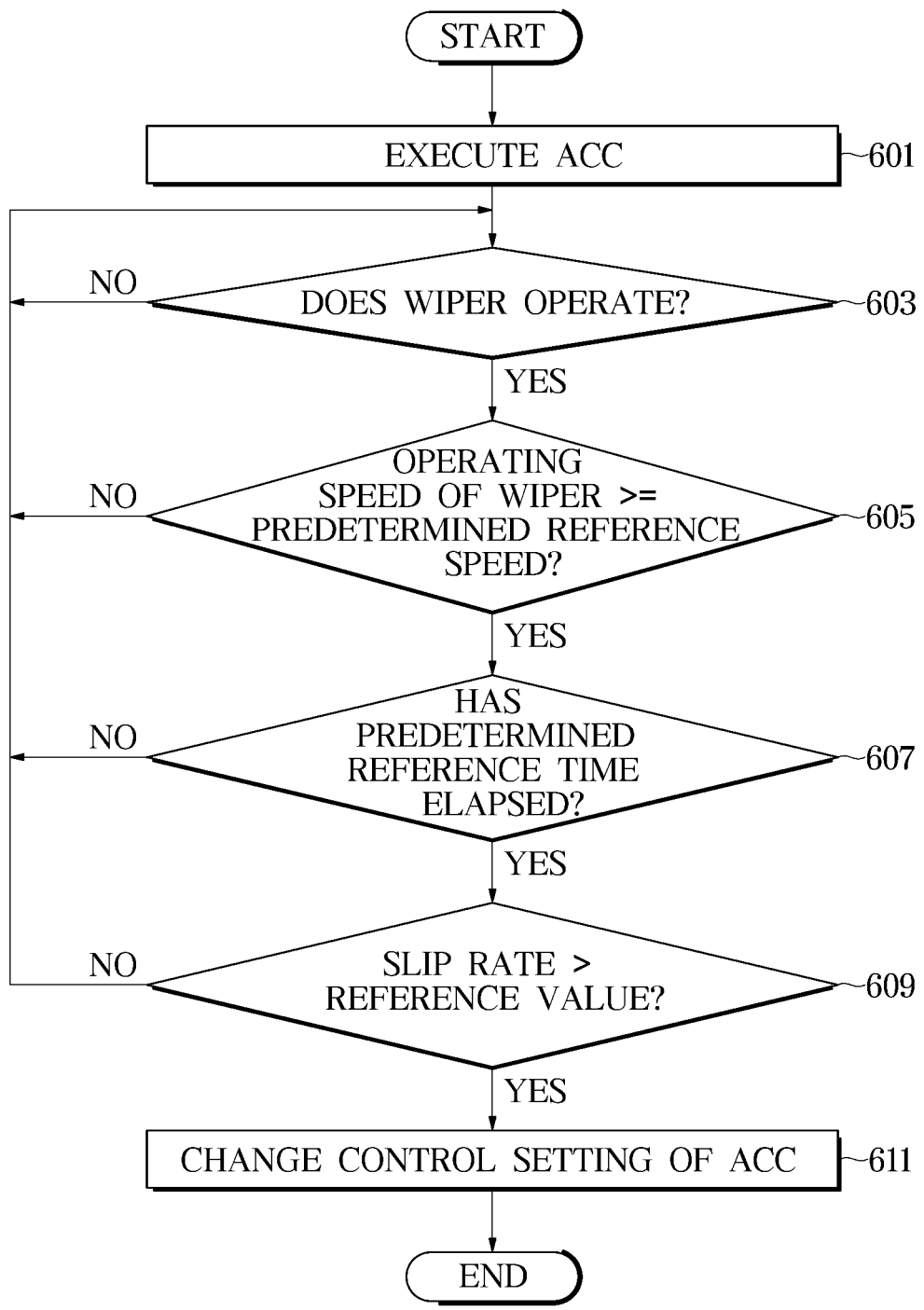
FIG. 6 is a flowchart illustrating operation of a driver assistance apparatus according to an embodiment of the disclosure.

FIG. 6 is a flowchart illustrating operation of the driver assistance apparatus 100 (and/or the controller 140 of the driver assistance apparatus 100) according to an embodiment of the disclosure.

The driver assistance apparatus 100 may execute the ACC of the vehicle 1 (in operation 601).

In accordance with the execution of the ACC, the vehicle 1 may travel while maintaining the distance to the preceding vehicle 5 as the first distance.

The driver assistance apparatus 100 may identify whether the wiper 70 of the vehicle 1 operates or not (in operation 603).

The driver assistance apparatus 100 may perform operation 605 upon identification of the operation of the wiper 70 of the vehicle 1, otherwise perform operation 603 again.

The driver assistance apparatus 100 may identify whether the operating speed of the wiper 70 of the vehicle 1 is greater than or equal to the predetermined reference speed (in operation 605).

In response to that the operating speed of the wiper 70 of the vehicle 1 is greater than or equal to the predetermined reference speed, the driver assistance apparatus 100 may perform operation 607, otherwise perform operation 603 again.

The driver assistance apparatus 100 may identify whether the predetermined reference time has elapsed since the operation of the wiper 70 (in operation 607).

In response to that the predetermined reference time has elapsed after the operation of the wiper 70, the driver assistance apparatus 100 may perform operation 609, otherwise perform operation 603 again.

The driver assistance apparatus 100 may identify whether the slip ratio of the vehicle 1 with respect to the road surface is greater than or equal to the predetermined reference value (in operation 609).

In response to that the slip ratio of the vehicle 1 with respect to the road surface is greater than or equal to the predetermined reference value, the driver assistance apparatus 100 may perform operation 611, otherwise perform operation 603 again.

The driver assistance apparatus 100 may change the control settings of the ACC of the vehicle 1 (in operation 611).

Changing the control settings of the ACC may include changing the control settings of the distance between the vehicle 1 and the preceding vehicle 5 to be increased, in other words, to change from the first distance to the second distance greater than the first distance, and/or changing the control settings of the vehicle to travel in deceleration.

For example, the driver assistance apparatus 100 may increase the predetermined reference time gap related to distance control between the vehicle 1 and the preceding vehicle 5 to the predetermined size. Accordingly, the driver assistance apparatus 100 may identify the speed to be controlled of the vehicle 1 based on the reference time gap increased to the predetermined size and the second distance. Based on this, the driver assistance apparatus 100 may control the distance between the vehicle 1 and the preceding vehicle 5 to be changed to the second distance, and control the distance between the vehicle 1 and the preceding vehicle 5 to maintain the second distance.

For example, the driver assistance apparatus 100 may adjust downward the allowable maximum value of the predetermined acceleration of the vehicle 1 to the predetermined value. Accordingly, the driver assistance apparatus 100 may control the vehicle 1 to decelerate based on the allowable maximum value adjusted downward to the predetermined value.

Figure 7:
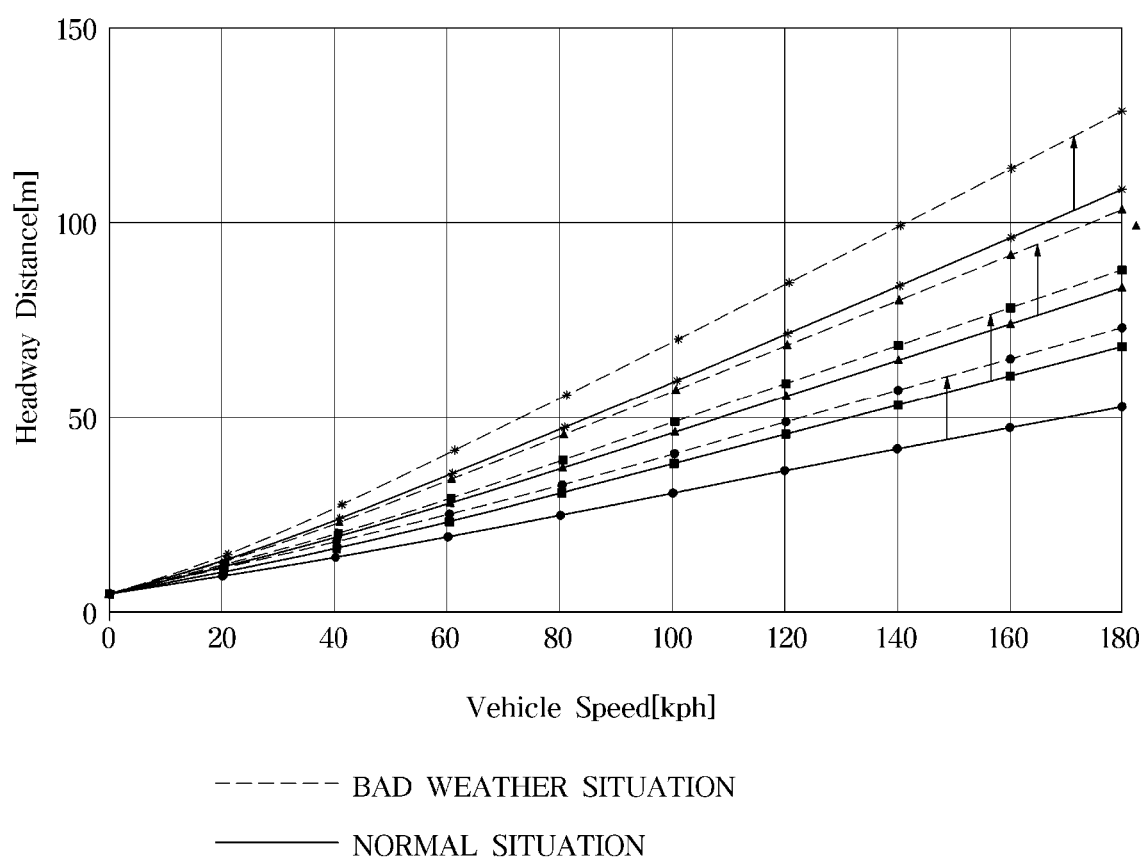
FIG. 7 is a view illustrating a distance relationship between a vehicle and a preceding vehicle according to vehicle speeds when a driver assistance apparatus according to an embodiment of the disclosure is in a normal situation and a bad weather situation.

FIG. 7 is a view illustrating a distance relationship between the vehicle 1 and the preceding vehicle according to vehicle speeds (also referred to as headway distance for each vehicle speed) when the driver assistance apparatus 100 (and/or the controller 140 of the driver assistance apparatus 100) according to an embodiment of the disclosure is in a normal situation and a bad weather situation;

According to the above-described embodiments, as shown in FIG. 7, because the vehicle 1 controls the vehicle 1 to be decelerated in a situation in which the weather is deteriorated due to snow or rain, it may be seen that the vehicle 1 increases the distance between the vehicle 1 and the preceding vehicle compared to the normal situation.

According to the above-described embodiments, the driver assistance apparatus 100 may determine the weather conditions outside the vehicle 1 based on one of the wiper 70 and other various conditions for determining the weather conditions. Accordingly, the driver assistance apparatus 100 adjusts the distance between the vehicle 1 and the preceding vehicle 5 upward in advance in preparation for the occurrence of blockage of the detector 105 in weather conditions such as snowy or rainy. As a result, the driver assistance apparatus 100 may improve the safety of driving of the vehicle 1, for example, driving of the vehicle 1 based on the ACC.

Furthermore, the driver assistance apparatus 100 may improve the driving safety of the vehicle 1 by adjusting the allowable maximum value of the acceleration of the vehicle 1, which is a result of the operation of the ACC of the vehicle 1.

Furthermore, the driver assistance apparatus 100 may estimate the gradient of the road surface on which the vehicle 1 travels, and thus improve the driving safety of the vehicle 1 based on the control such as adjusting the distance between the vehicle 1 and the preceding vehicle 5 and/or the allowable maximum value of the acceleration of the vehicle 1 on the downhill road.

Figure 8:
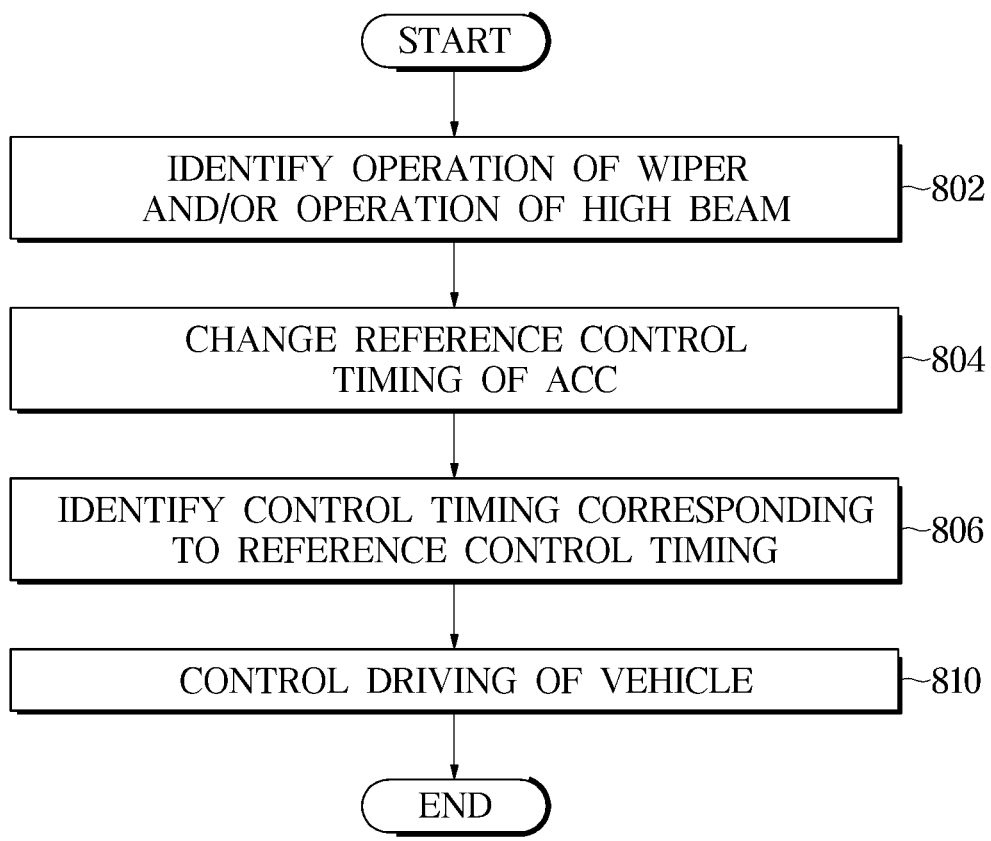
FIG. 8 is a flowchart illustrating operation of a driver assistance apparatus according to an embodiment of the disclosure.
Figure 9:
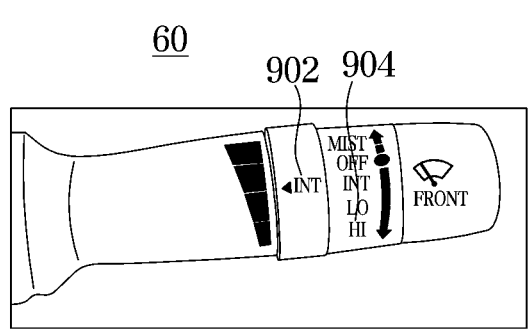
FIG. 9 is a view illustrating a manipulation of a first lever and a second lever by a driver according to an exemplary embodiment.
Figure 9:
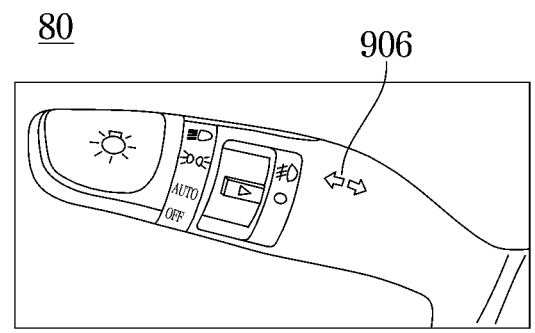
Figure 10:
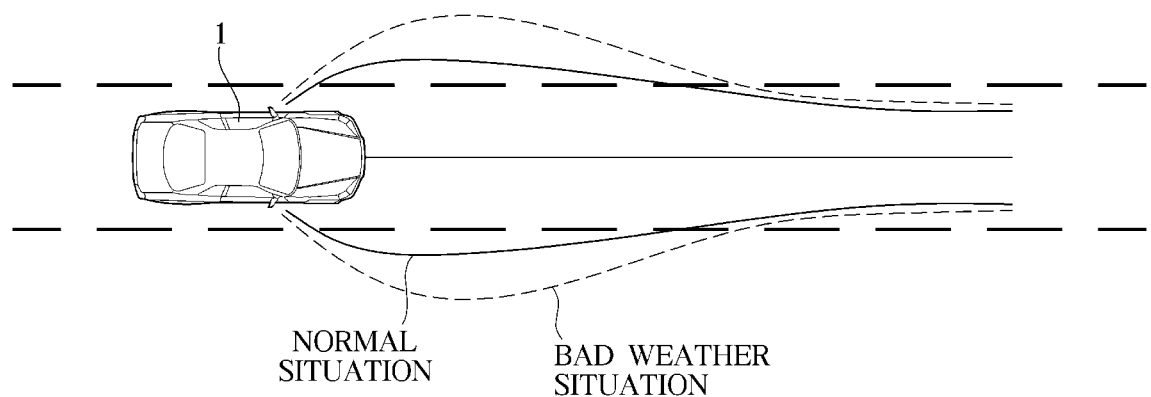
FIG. 10 is a view illustrating a vehicle control operation of a driver assistance apparatus according to an embodiment of the disclosure.

FIG. 8 is a flowchart illustrating operation of the driver assistance apparatus 100 (and/or the controller 140 of the driver assistance apparatus 100) according to an embodiment of the disclosure. FIG. 9 is a view illustrating a manipulation of the first lever 60 and the second lever 80 by the driver according to an embodiment of the disclosure. FIG. 10 is a view illustrating a control operation of the vehicle 1 of the driver assistance apparatus 100 (and/or the controller 140 of the driver assistance apparatus 100) according to an embodiment of the disclosure.

The driver assistance apparatus 100 may identify the operation of the wiper 70 of the vehicle 1 and/or the operation of the high beam 90 of the vehicle 1 (in operation 802).

The driver assistance apparatus 100 may identify the operation of the wiper 70 based on the user manipulation of the first lever 60 as shown in FIG. 9A or an output value of the rain sensor 53.

The driver assistance apparatus 100 may identify settings that whether the first lever 60 is in the an intermittent (INT) state that allows the wiper 70 of the vehicle 1 to be operated while maintaining a constant interval according to a driver's manipulation of the vehicle 1 and whether the wiper 70 is set to operate at the fastest speed. The driver assistance apparatus 100 may identify the operation of the wiper 70 based on the above settings identification.

The driver assistance apparatus 100 may identify a HI state setting that allows the operation speed of the wiper 70 according to the driver's manipulation of the vehicle 1 to be continuously operated in the fastest state. The driver assistance apparatus 100 may identify an operating frequency of the wiper 70 corresponding to a setting enabling the wiper 70 to operate at the fastest speed. The driver assistance apparatus 100 may identify the operation of the wiper 70 based on the identification of the HI state and the identification of the operation frequency.

The driver assistance apparatus 100 may identify whether the operation speed of the wiper 70 is the maximum based on the operation identification of the wiper 70.

The driver assistance apparatus 100 may identify whether the high beam 90 of the vehicle 1 is turned on based on the user manipulation of the second lever 80 as shown in FIG. 9B. For example, the driver assistance apparatus 100 may exclude the turning on the high beam 90 based on the operation of the HBA function from the condition of the operation of changing the control timing of the ACC that will be described later in an embodiment of the disclosure.

The driver assistance apparatus 100 may change a reference control timing of the ACC of the vehicle 1 based on the operation of the wiper 70 of the vehicle 1 and/or the operation of the high beam 90 of the vehicle 1 (in operation 804).

In response to that the operating speed of the wiper 60 of the vehicle 1 is greater than or equal to the predetermined reference speed and/or the high beam 90 of the vehicle 1 is turned on, the driver assistance apparatus 100 may identify that it is currently rainy or snowy, in other words, that external weather has deteriorated.

In response to that the operating speed of the wiper 60 of the vehicle 1 is greater than or equal to the predetermined reference speed and/or the high beam 90 of the vehicle 1 is turned on, the driver assistance apparatus 100 may change the control timing of the ACC of the vehicle 1.

For example, the driver assistance apparatus 100 may quickly change a predetermined braking responsiveness (also referred to as deceleration and/or acceleration responsiveness) of the vehicle 1 to a first speed. The first speed may be a predetermined speed that is faster than the predetermined braking responsiveness.

For example, the driver assistance apparatus 100 may change the distance step between the vehicle 1 and the preceding vehicle into a predetermined distance step. For example, the first to fourth distance steps may be predetermined, and assuming that the distance between vehicles is controlled to increase from the first distance step to the fourth distance step, the driver assistance apparatus 100 may change the distance step between the vehicle 1 and the preceding vehicle into the fourth step that is the distance step of the furthest headway distance.

The driver assistance apparatus 100 may identify the control timing corresponding to the reference control timing of the ACC (in operation 806).

The driver assistance apparatus 100 may obtain a first signal through the first radar 121 and may identify the control timing corresponding to the reference control timing of the ACC based on the first signal.

The driver assistance apparatus 100 may obtain the first signal through the first radar 121 and obtain a second signal through at least one second radar 131 and 132, and may identify the control timing corresponding to the reference control timing of the ACC based on the first signal and the second signal.

For example, in response to turning on the at least one second radar 131 and 132 based on the operation of the wiper 70 and the operation of the high beam 90, as shown in FIG. 10, the driver assistance apparatus 100 may improve detection reliability of a target, for example, the preceding vehicle, in an enlarged field of view (FOV) when the vehicle 1 is traveled in a bad weather situation.

The driver assistance apparatus 100 may identify the distance between the vehicle 1 and the preceding vehicle located in front of the vehicle 1 based on the first signal obtained through the first radar 121 and/or the second signal obtained through at least one second radar 131 and 132. The driver assistance apparatus 100 may identify the control timing for controlling the vehicle 1, which corresponds to the reference control timing of the ACC, based on the distance between the vehicle 1 and the vehicle in front.

The driver assistance apparatus 100 may control the driving of the vehicle 1 in response to identification of the control timing corresponding to the reference control timing of the ACC (in operation 808).

In response to the identification of the control timing corresponding to the reference control timing of the ACC, the driver assistance apparatus 100 may control the driving of the vehicle 1 so that the vehicle 1 drives while maintaining the second distance greater than the first distance from the first distance. In addition to the above-described embodiments, in response to that a control value of the accelerator of the vehicle 1 based on the user manipulation is greater than or equal to a predetermined reference value, the driver assistance apparatus 100 may control a output device of the vehicle 1 to output a warning signal through the output device, for example, a display and/or a speaker.

Furthermore, in response to that the control value of the accelerator of the vehicle 1 is greater than or equal to the predetermined reference value, the driver assistance apparatus 100 may release the driving control of the vehicle 1.

Herein, the predetermined reference value may be determined as a reference value to the extent that frequent release does not occur even in consideration of bad weather conditions.

For example, the vehicle 1 may receive an operation strength signal of the accelerator pedal by the driver of the vehicle 1, and in response to that the operation strength signal is greater than or equal to a predetermined reference value, may output a warning pop-up on the display of the vehicle 1 and release the driving control of the vehicle 1 of the driver assistance apparatus 100. Accordingly, for a later dangerous situation, the vehicle 1 may respond by the AEB, which is a safety function of the vehicle 1.

Figure 11:
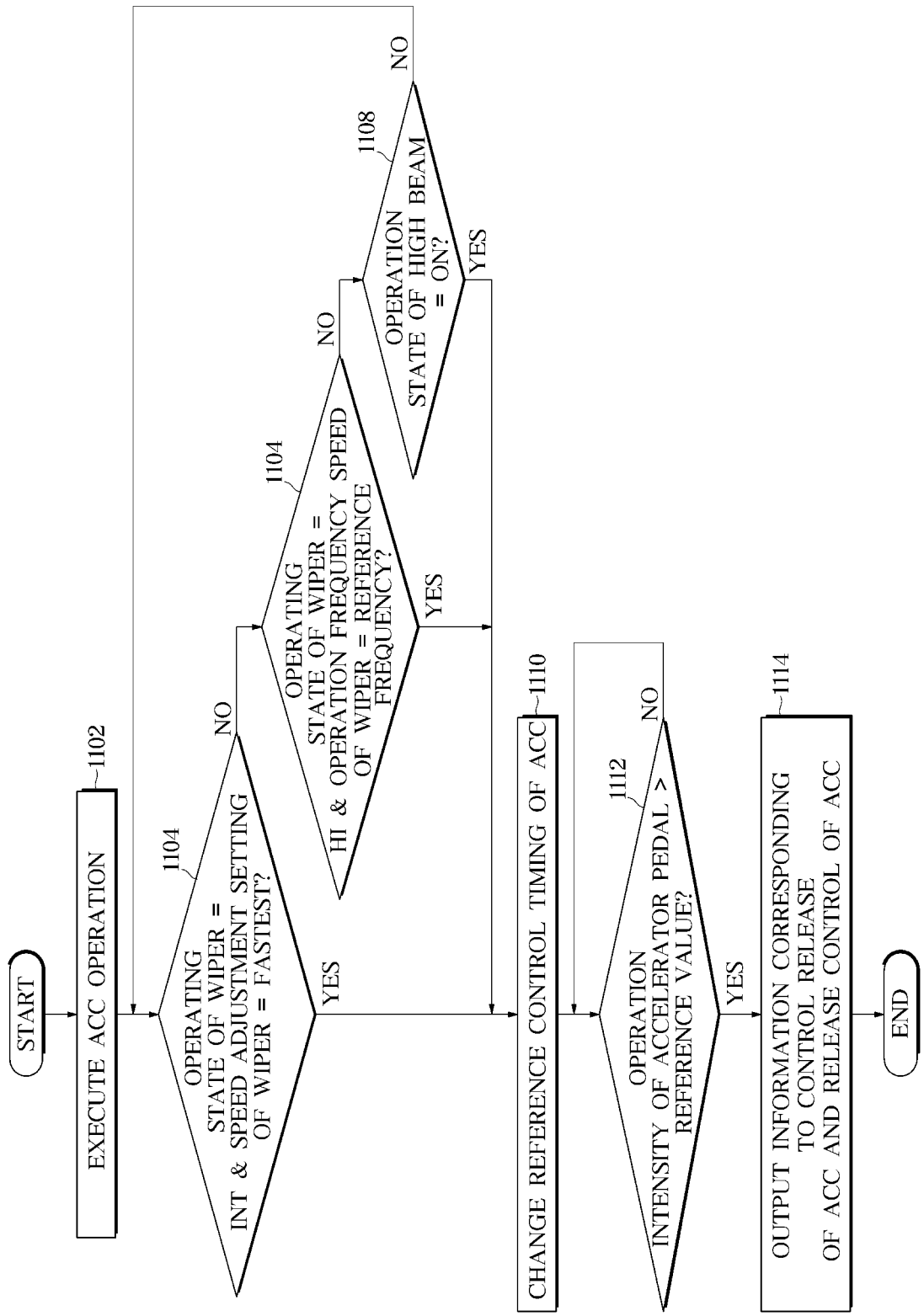
FIG. 11 is a flowchart illustrating operation of a driver assistance apparatus according to an embodiment of the disclosure.

FIG. 11 is a flowchart illustrating the operation of the driver assistance apparatus 100 (and/or the controller 140 of the driver assistance apparatus 100) according to an embodiment of the disclosure.

The driver assistance apparatus 100 may execute the ACC operation (in operation 1102).

The driver assistance apparatus 100 may identify whether the operating state of the wiper 70 is the INT state and the speed adjustment setting of the wiper 70 is the fastest during execution of the ACC operation (in operation 1104).

When the operation state of the wiper 70 is the INT state and the speed adjustment setting of the wiper 70 is the fastest, operation 1110 may be performed, otherwise operation 1106 may be performed.

The driver assistance apparatus 100 may identify whether the operation state of the wiper 70 is the HI state and the operation frequency of the wiper 70 is the reference frequency (in operation 1106).

When the operation state of the wiper 70 is the HI state and the operation frequency of the wiper 70 is the reference frequency, operation 1110 may be performed, otherwise operation 1108 may be performed.

The driver assistance apparatus 100 may identify whether the operation state of the high beam 90 is turned on (in operation 1108).

When the high beam 90 is turned on, operation 1110 may be performed, otherwise operation 1104 may be performed again.

The driver assistance apparatus 100 may change the reference control timing of the ACC (in operation 1110).

Changing the reference control timing of the ACC of the driver assistance apparatus 100 may include rapidly changing the predetermined braking responsiveness (also referred to as acceleration responsiveness) of the vehicle 1 to the first speed. The first speed may be a predetermined speed that is faster than the predetermined braking responsiveness.

Changing the reference control timing of the ACC of the driver assistance apparatus 100 may include changing the distance step between the vehicle 1 and the preceding vehicle into the predetermined distance step. For example, the first to fourth distance steps may be predetermined, and assuming that the distance between vehicles is controlled to increase from the first distance step to the fourth distance step, the driver assistance apparatus 100 may change the distance step between the vehicle 1 and the preceding vehicle into the fourth step that is the distance step of the furthest headway distance.

After the reference control timing of the ACC is changed, the driver assistance apparatus 100 may identify whether an operation intensity of the pedal of the accelerator of the vehicle 1 is greater than or equal to the predetermined reference value (in operation 1112).

When the operation intensity of the pedal of the accelerator of the vehicle 1 is greater than or equal to the predetermined reference value, operation 1114 may be performed, otherwise operation 1112 may be performed again.

The driver assistance apparatus 100 may control the output device of the vehicle 1 to output information corresponding to the control release of the ACC, and release the control of the ACC (in operation 1114).

In addition to the above-described embodiments, the driver assistance apparatus 100 may turn on the first radar 121 to perform the ACC operation of operation 1102 described above. Furthermore, the driver assistance apparatus 100 may turn on the at least one second radar 131 and 132 before performing operation 1110 based on operation 1104, operation 1106, or operation 1108 described above.

Furthermore, in addition to the above-described embodiments, the driver assistance apparatus 100 may prevent a collision accident through such as, the deceleration control of the vehicle 1 by identifying a vehicle close to the vehicle 1 based on first detection data obtained through the first radar 121 and/or second detection data obtained through the at least one second radar 131 and 132. For example, the driver assistance apparatus 100 may identify the control timing corresponding to the changed reference control timing of the ACC based on the first detection data obtained through the first radar 121 and/or the second detection data obtained through the at least one second radar 131 and 132. The driver assistance apparatus 100 may prevent the collision accident of the vehicle 1 by controlling the driving of the vehicle 1 when the control timing corresponding to the changed reference control timing of the ACC is identified.

Furthermore, in addition to the above-described embodiments, the driver assistance apparatus 100 may provide a menu (or an icon or button) for setting turn-on or turn-off for the execution of the operation for changing the reference control timing of the above-described embodiments, that is, the ACC, through the output device of the vehicle 1. Accordingly, the driver assistance apparatus 100 may perform the above-described operations when the setting for turn-on is performed according to a user manipulation, and may not perform the above-described operations when the setting for turn-off is performed.

According to the above-described embodiments, even when the hardware detection performance of the first radar 121 of the vehicle 1 is deteriorated, the at least one second radar 131 and 132 operates, so that the risk of accident may reduce in the ACC operation of the vehicle 1.

Furthermore, when the vehicle 1 is driven in a situation in which the driver's visibility is not guaranteed, such as rainy or the like, the vehicle 1 may respond through the ACC to the approach of a nearby vehicle.

Furthermore, by arbitrarily increasing the distance between the vehicle 1 and the vehicle in front according to external weather conditions, a driver's reaction time to the situation ahead may be secured.

Furthermore, by adjusting the braking responsiveness (also referred to as deceleration and/or acceleration responsiveness), the vehicle 1 may control to perform an immediate defensive driving by the ACC in an accident risk situation.

As is apparent from the above, an embodiment of the disclosure may provide a driver assistance apparatus and a driver assistance method capable of reducing human casualties by reducing collision accidents between the vehicle and the preceding vehicle in an external weather situation such as bad weather.

In general, when the vehicle is traveling at high speed on a highway, etc., in weather conditions such as bad weather, it may not be good to secure the front view of the driver and the vehicle. Accordingly, a collision between the vehicle and the vehicle in front and/or a collision between the vehicle and the nearby vehicle approaching in close may occur, which may lead to multiple collisions. Furthermore, in the case that the vehicle is driven in weather conditions such as bad weather and/or on a steep downhill road, if the distance between the vehicle and the vehicle in front is short and the vehicle accelerates quickly, the driver may have anxiety about the occurrence of an accident.

Therefore, the driver assistance apparatus and the driver assistance method of the disclosure may adjust upward the distance between the vehicle and the vehicle in front, so that the reaction time for the situation ahead of the vehicle and the driver may be secured. Furthermore, the driver assistance apparatus and the driver assistance method of the disclosure may limit the acceleration of the vehicle compared to the general weather conditions by adjusting downward the allowable maximum value of the required acceleration of the ACC. Furthermore, the driver assistance apparatus and the driver assistance method of the disclosure may quickly change the control timing of the ACC compared to the general weather situation.

Accordingly, the driver assistance apparatus and the driver assistance method may reduce the possibility of a collision between the vehicle and the vehicle in front and the possibility of multiple collision accidents, and allow the driver to have psychological stability. Furthermore, the driver assistance apparatus and the driver assistance method may improve the responsiveness of the ACC to immediately respond to the nearby vehicle approaching the vehicle or allow the user to immediately perform defensive driving.

The embodiments of the disclosure may provide a driver assistance apparatus and a driver assistance method capable of notifying the driver of a dangerous situation and releasing the ACC when the driver operates the vehicle for excessive acceleration during the ACC.

On the other hand, embodiments of the disclosure may be implemented in the form of a recording medium storing instructions executable by a computer. Instructions may be stored in the form of program code, and when executed by a processor, may generate program modules to perform operations of the disclosed embodiments. The recording medium may be implemented as a computer-readable recording medium.

The computer-readable recording medium includes all kinds of recording media in which instructions which can be decoded by a computer are stored, for example, a read only memory (ROM), a random access memory (RAM), a magnetic tape, a magnetic disk, a flash memory, an optical data storage device, and the like.

Embodiments of the disclosure have thus far been described with reference to the accompanying drawings. It should be apparent to those of ordinary skill in the art that the disclosure may be practiced in other forms than the embodiments as described above without changing the technical idea or essential features of the disclosure. The above embodiments are only by way of example, and should not be interpreted in a limited sense.

What is claimed is:

1. A driver assistance apparatus, comprising:
a detector installed in a vehicle, the detector having a view in front of a vehicle and configured to obtain detection data; and
a controller including a processor configured to process the detection data;
wherein the controller is configured to:
perform an adaptive cruise control (ACC) that maintains a distance with a vehicle in front at a first distance based on the detection data,
determine, while the ACC is performed, a slip rate of the vehicle with respect to a road surface when a condition of an operation of a wiper is satisfied, wherein the condition comprises an operating speed of a wiper exceeds a predetermined speed for a predetermined duration, and
control a driving of the vehicle to maintain the distance with the vehicle in front to a second distance greater than the first distance upon determining the slip rate is greater than a reference value.

2. The driver assistance apparatus of claim 1, wherein the controller is configured to:
increase a predetermined reference time gap related to distance control between the vehicle and the vehicle in front to a predetermined amount based on the operation of the wiper and the slip rate;
identify a speed of the vehicle to be controlled based on the predetermined reference time gap increased by the predetermined amount and the first distance; and
control the driving of the vehicle so that the distance between the vehicle and the vehicle in front is changed to the second distance based on the identified speed.

3. The driver assistance apparatus of claim 1, wherein the controlling of the driving of the vehicle comprises controlling the vehicle to travel in deceleration, and
the controller is configured to:
adjust downward an allowable maximum value of a predetermined acceleration of the vehicle based on the operation of the wiper and the slip ratio, and
control the driving of the vehicle so that the vehicle decelerates based on the downward adjustment of the allowable maximum value of the predetermined acceleration.

4. The driver assistance apparatus of claim 1, wherein the controller is configured to:
identify weather conditions outside the vehicle as a rainy or snowy condition based on the operation of the wiper and the slip rate, and
control the driving of the vehicle in response to identification of the weather conditions outside the vehicle as a rainy or snowy condition.

5. The driver assistance apparatus of claim 1, wherein the controller is configured to:
identify external temperature information received from a temperature sensor of the vehicle, and
control the driving of the vehicle further based on the external temperature information being less than or equal to a predetermined reference temperature.

6. The driver assistance apparatus of claim 1, wherein the controller is configured to:
calculate a gradient of the road surface based on a signal received from a gyro sensor of the vehicle, and
control the driving of the vehicle further based on the gradient of the road surface.

7. The driver assistance apparatus of claim 1, wherein the controller is configured to calculate the slip ratio based on the speed of the vehicle and a rotation speed of each wheel of the vehicle.

8. A driver assistance apparatus, comprising:
a first detector installed in a vehicle, the first detector having a view in front of a vehicle and configured to obtain first detection data; and
a controller including a processor configured to process the first detection data,
wherein the controller is configured to:
change a reference control timing of an adaptive cruise control (ACC) for maintaining a distance with a vehicle in front as a first distance based on the first detection data, in response to an operation speed of a wiper of the vehicle being greater than or equal to a predetermined speed;
identify a control timing corresponding to the changed reference control timing of the ACC; and
in response to the identification of the control timing, control a driving of the vehicle to maintain the distance with the vehicle in front to a second distance greater than the first distance.

9. The driver assistance apparatus of claim 8, further comprises at least one second detector,
wherein the controller is configured to:
turn on the at least one second detector based on an operation of the wiper, and
identify the control timing further based on second detection data obtained through the at least one second detector.

10. The driver assistance apparatus of claim 8, wherein the controller is configured to rapidly change a predetermined braking responsiveness of the vehicle to a first speed based on the operation speed of the wiper being greater than or equal to the predetermined speed.

11. The driver assistance apparatus of claim 8, wherein the controller is configured to change a distance step between the vehicle and the vehicle in front to a predetermined distance step based on the operation speed of the wiper being greater than or equal to the predetermined speed, and the predetermined distance step corresponds to the second distance.

12. The driver assistance apparatus of claim 8, wherein the controller is configured to control an output device to output a warning signal through the output device of the vehicle in response to that a control value of an accelerator of the vehicle based on a user manipulation is greater than or equal to a predetermined reference value.

13. The driver assistance apparatus of claim 12, wherein the controller is configured to release the ACC in response to that the control value of the accelerator of the vehicle is greater than or equal to the predetermined reference value.

14. A driver assistance method, the method comprising the steps of:

performing an adaptive cruise control (ACC) for maintaining a distance with a vehicle in front at a first distance based on detection data obtained through a detector;

determine, while the ACC performed, a slip rate of the vehicle with respect to a road surface when a condition of an operation of a wiper is satisfied, wherein the condition comprises an operating speed of a wiper exceeds a predetermined speed for a predetermined duration; and controlling a driving of the vehicle to maintain the distance with the vehicle in front to a second distance greater than the first distance upon determining the slip rate is greater than a reference value.

15. The method of claim 14, wherein the step of controlling comprises:

increasing a predetermined reference time gap related to distance control between the vehicle and the vehicle in front to a predetermined amount based on the operation of the wiper and the slip rate;

identifying a speed of the vehicle to be controlled based on the predetermined reference time gap increased by the predetermined amount and the first distance; and controlling the driving of the vehicle so that the distance between the vehicle and the vehicle in front is changed to the second distance based on the identified speed.

16. The method of claim 14, further comprising a step of:

adjusting downward an allowable maximum value of a predetermined acceleration of the vehicle based on the operation of the wiper and the slip ratio, and controlling the driving of the vehicle so that the vehicle decelerates based on the downward adjustment of the allowable maximum value of the predetermined acceleration.

17. The method of claim 14, wherein the step of controlling comprises:

identifying weather conditions outside the vehicle as a rainy or snowy condition based on the operation of the wiper and the slip rate, and controlling the driving of the vehicle in response to identification of the weather conditions outside the vehicle as a rainy or snowy condition.

18. The method of claim 14, wherein the step of controlling comprises:

identifying external temperature information received from a temperature sensor of the vehicle, and controlling the driving of the vehicle further based on the external temperature information being less than or equal to a predetermined reference temperature.

* * * * *